(12) United States Patent
Bergeron et al.

(10) Patent No.: US 8,514,386 B2
(45) Date of Patent: Aug. 20, 2013

(54) TECHNIQUE FOR VERIFYING THE MICROSTRUCTURE OF LEAD-FREE INTERCONNECTS IN SEMICONDUCTOR ASSEMBLIES

(75) Inventors: Christian Bergeron, Granby (CA); Pascal Blais, Shefford (CA); Clement Fortin, Granby (CA); Luc Guerin, Granby (CA)

(73) Assignee: International Business Machines Corporation, Armonk, NY (US)

( * ) Notice: Subject to any disclaimer, the term of this patent is extended or adjusted under 35 U.S.C. 154(b) by 166 days.

(21) Appl. No.: 13/115,823

(22) Filed: May 25, 2011

(65) Prior Publication Data

US 2012/0300220 A1    Nov. 29, 2012

(51) Int. Cl.
*G01N 21/00* (2006.01)
*G01N 21/88* (2006.01)

(52) U.S. Cl.
USPC ................. 356/237.1; 356/237.4; 356/237.5

(58) Field of Classification Search
USPC .............. 356/237.1–237.5; 438/14, 613; 257/48, 737, 738; 228/6.2, 33, 254, 56.3
See application file for complete search history.

(56) References Cited

U.S. PATENT DOCUMENTS

| | | | |
|---|---|---|---|
| 4,988,202 A | | 1/1991 | Nayar et al. |
| 5,247,344 A | | 9/1993 | Doan |
| 5,564,617 A | * | 10/1996 | Degani et al. ................. 228/6.2 |
| 5,775,569 A | * | 7/1998 | Berger et al. ................. 228/254 |
| 5,828,128 A | | 10/1998 | Higashiguchi et al. |
| 5,886,362 A | * | 3/1999 | Millican et al. ................. 257/48 |
| 5,914,536 A | * | 6/1999 | Shizuki et al. ................. 257/778 |
| 5,971,608 A | | 10/1999 | Koizumi |
| 6,146,014 A | * | 11/2000 | Bruce et al. ................. 374/161 |
| 6,165,885 A | * | 12/2000 | Gaynes et al. ................. 438/612 |
| 6,476,494 B1 | * | 11/2002 | Hur et al. ................. 257/762 |
| 6,657,707 B1 | * | 12/2003 | Morken et al. ................. 356/36 |
| 7,169,627 B2 | * | 1/2007 | Duh et al. ................. 438/16 |
| 7,268,303 B2 | * | 9/2007 | Ashida ................. 174/260 |
| 7,612,296 B2 | | 11/2009 | Rohde et al. |
| 2004/0016995 A1 | * | 1/2004 | Kuo et al. ................. 257/678 |
| 2006/0201997 A1 | * | 9/2006 | Tung ................. 228/101 |
| 2009/0016995 A1 | * | 1/2009 | Ethell et al. ................. 424/93.7 |

OTHER PUBLICATIONS

Willis, Bob, "BGA—Ball Grid Array Inspection Workshop," http://www.smartgroup.org/pdf/bgainspection/bobwillis.pdf, first accessed on Nov. 30, 2010, Publication date unknown.

(Continued)

*Primary Examiner* — Sang Nguyen
(74) *Attorney, Agent, or Firm* — Nelson and Nelson; Daniel P. Nelson; Alexis V. Nelson

(57) ABSTRACT

A method for verifying the internal microstructure of interconnects in flip-chip applications includes providing a microelectronic assembly comprising the following: a substrate hosting an array of flip-chip attach pads and one or more process control pads; a flip chip having an array of solder bumps in contact with the array of flip-chip attach pads; and one or more representative solder bumps contacting the one or more process control pads. The representative solder bumps have a substantially similar or identical chemical composition as the array of solder bumps. A reflow cycle is then applied to the microelectronic assembly to melt and solidify the array of solder bumps on the flip-chip attach pads and melt and solidify the representative solder bumps on the process control pads. The surface texture of the representative solder bumps is then optically inspected to determine an internal microstructure of the array of solder bumps.

19 Claims, 7 Drawing Sheets

(56) References Cited

OTHER PUBLICATIONS

Patel, Neha, et al., "Flip-Chip Packaging Technology for Enabling 45nm Products," Intel Technology Journal, vol. 12, Issue 2, 2008.

Frear, D.R., et al., "Pb-Free Solders for Flip-Chip Interconnects," JOM, Jun. 2001.
NEC Corp., "Rework Procedure for NECEL's Flip Chip Ball Grid Array Packages," http://www2.renesas.eu/_pdf/C16776EJ1V0IF00.PDF, Jul. 2003.

* cited by examiner

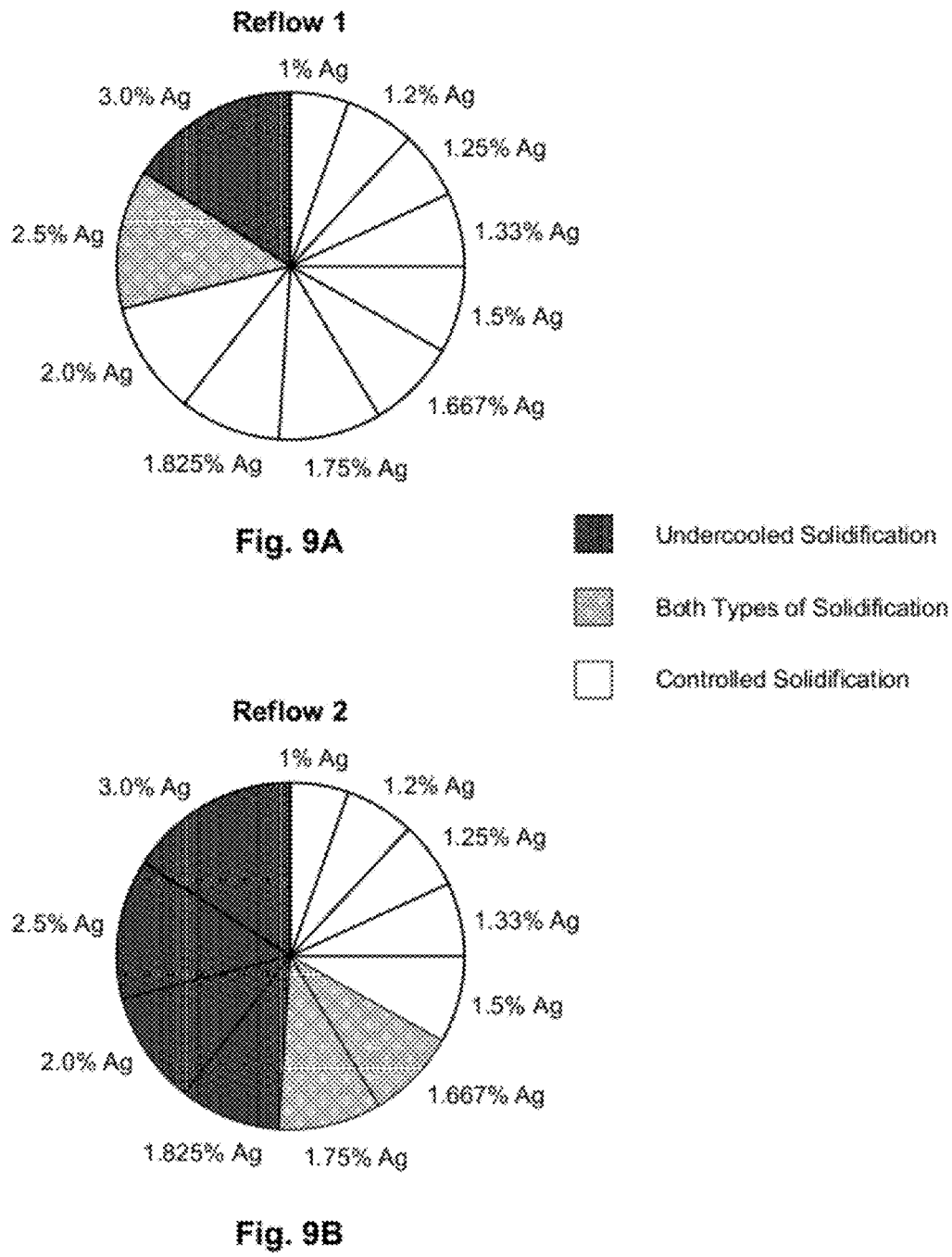

TECHNIQUE FOR VERIFYING THE MICROSTRUCTURE OF LEAD-FREE INTERCONNECTS IN SEMICONDUCTOR ASSEMBLIES

BACKGROUND

1. Field of the Invention

This invention relates to semiconductor devices, and more specifically to techniques for verifying the microstructure of lead-free interconnects in semiconductor assemblies.

2. Background of the Invention

Because of the environmental effects of lead (Pb), transitioning to lead-free soldering is currently on the agenda of many companies that manufacture electronics equipment. Lead is a primary constituent in conventional solder, which is used in all types of electronics. The disposal of such electronics has raised concerns about the amount of lead that is entering the environment through landfills or other avenues. To minimize the effect on the environment, legislation has been enacted in various parts of the world to mandate or encourage the transition to lead-free soldering.

Currently, the electronics industry is experimenting with lead-free, tin-based solders (e.g., tin-based alloys containing elements such as silver, copper, nickel, bismuth, gold, or the like) to provide means for interconnecting flip chips and other semiconductor devices with external circuitry. Unfortunately, lead-free, tin-based solders are typically substantially more rigid than their lead-based counterparts, making chip circuitry more susceptible to cracking and delamination. As a result, electronics manufacturers are working to develop processes and techniques to mitigate and/or compensate for the inherent rigidity of lead-free, tin-based solders.

The microstructure of lead-free, tin-based interconnects falls into one of two categories: (1) undercooled solidification type; and (2) controlled solidification type. The "naturally" solidified tin-based interconnect generally falls into the first category (i.e., the undercooled category), at least partly because the heterogeneous nucleation of beta-tin is difficult. This type of solidification produces a rigid, high-stress interconnect which is prone to chip circuitry fracture and/or delamination. In certain cases, interconnect size contributes to the undercooling state.

Interconnects of the controlled solidification type are softer and more ductile, and thus more reliable, than their undercooled counterparts. Such interconnects typically contain larger grains beta-tin, formed during a controlled heating and cooling process. These grains are surrounded by intermetallics or intermetallic compounds. In addition to carefully controlling the heating and cooling process, research has produced techniques to reduce undercooled solidification by adding different alloy elements to the tin-based solder.

Nevertheless, even if interconnects of the controlled solidification type can be produced, verifying the microstructure can be difficult, particularly in flip-chip applications where the interconnects are substantially hidden from view. A cross-section is required to determine if the interconnects have achieved a desired microstructure. However, creating such cross-sections is time-consuming and may require specialized human and tooling resources. Thus, such techniques may not be suitable for verifying the integrity of interconnects on a full-scale production line.

In view of the foregoing, techniques are needed to quickly identify whether a desired microstructure (e.g., controlled solidification type) has been achieved in flip-chip interconnects or other interconnects that utilize lead-free solder. Ideally, such techniques could be implemented on a full-scale production line to provide substantially instantaneous quality control feedback.

SUMMARY

The invention has been developed in response to the present state of the art and, in particular, in response to the problems and needs in the art that have not yet been fully solved by current techniques. Accordingly, the invention has been developed to provide techniques for quickly identifying whether a desired microstructure (e.g., controlled solidification type) has been achieved in lead-free solder interconnects. The features and advantages of the invention will become more fully apparent from the following description and appended claims, or may be learned by practice of the invention as set forth hereinafter.

Consistent with the foregoing, a method for verifying the internal microstructure of interconnects in flip-chip applications is disclosed herein. In one embodiment, such a method includes providing a microelectronic assembly comprising the following: a substrate hosting an array of flip-chip attach pads and one or more process control pads; a flip chip having an array of solder bumps in contact with the array of flip-chip attach pads; and one or more representative solder bumps contacting the one or more process control pads. The representative solder bumps have a substantially similar or identical chemical composition as the array of solder bumps. The method then applies a reflow cycle to the microelectronic assembly to melt and solidify the array of solder bumps on the flip-chip attach pads and the representative solder bumps on the process control pads. The method then optically inspects a surface texture of the representative solder bumps in order to determine an internal microstructure of the array of solder bumps.

In another aspect of the invention, a microelectronic assembly that enables easy verification of the internal microstructure of flip-chip interconnects is disclosed herein. In one embodiment, such a microelectronic assembly includes a substrate having an array of flip-chip attach pads and one or more process control pad deposited thereon; a flip chip having an array of solder bumps bonded to the array of flip-chip attach pads; and one or more representative solder bumps bonded to the one or more process control pads and viewable from a top side thereof. The representative solder bumps have a chemical composition that is substantially the same as or identical to the chemical composition of the array of solder bumps. After a reflow process, the representative solder bumps will have a surface texture that provides a visual indicator of the internal microstructure of the array of solder bumps.

In yet another aspect of the invention, a method for determining a suitable lead-free solder composition for use in a microelectronic assembly includes providing a substrate and depositing multiple solder bumps on the substrate. The solder bumps include solder bumps of at least two different compositions. The substrate is then passed through a reflow cycle to melt and re-solidify the solder bumps. The method then optically inspects the surface texture of the solder bumps to determine which of the solder bumps has a desired microstructure. In certain embodiments, solder bumps with a desired microstructure will have a "turtle shell" appearance. A composition associated with a solder bump having a desired microstructure may be selected for use in a microelectronic assembly.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 9A shows the results of a first experiment where several different tin-silver solder compositions were passed through a first reflow cycle;

FIG. 9B shows the results of a second experiment where the same tin-silver solder compositions described in FIG. 9A were passed through a second reflow cycle;

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
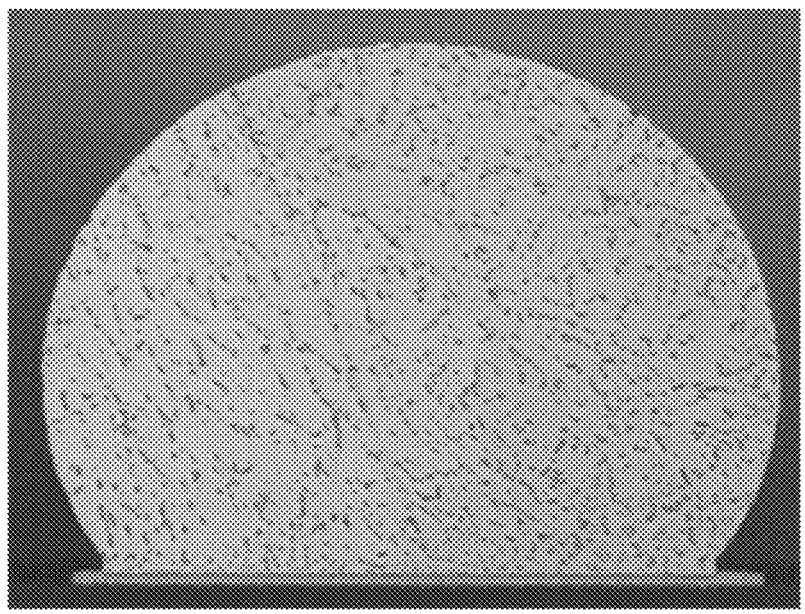
FIG. 1 is a cross-sectional view showing the internal microstructure of a tin-based solder interconnect produced by an undercooled (i.e., uncontrolled) solidification process.

Referring to FIG. 1, as previously mentioned, the microstructure of lead-free, tin-based interconnects may fall into one of two categories: (1) undercooled solidification type; and (2) controlled solidification type. The undercooled (i.e., uncontrolled) solidification type is undesirable in that it creates a high-stress interconnect with low ductility that is prone to chip circuitry delamination or fracture. FIG. 1 is a cross-sectional view showing the internal microstructure of a tin-based solder interconnect (e.g., a C4) produced using an undercooled solidification process. Such a microstructure may be produced when the interconnect is solidified to a temperature below the solidus temperature. Most if not all chip-attach processes currently in use or under development produce interconnects having this type of microstructure.

The dark spots on the cross-section indicate the presence of intermetallics or intermetallic compounds (e.g., non-tin alloy elements such as silver, copper, nickel, bismuth, gold, or combinations thereof) that are contained in the tin-based alloy. The lighter areas around the dark spots indicate the presence of tin or beta-tin As can be observed, the spots representing the intermetallics or intermetallic compounds are distributed substantially evenly through the interconnect, forming what amounts to a precipitate in the tin-based alloy. This type of microstructure is undesirable because it produces a rigid interconnect that is more prone to failure.

Figure 2:
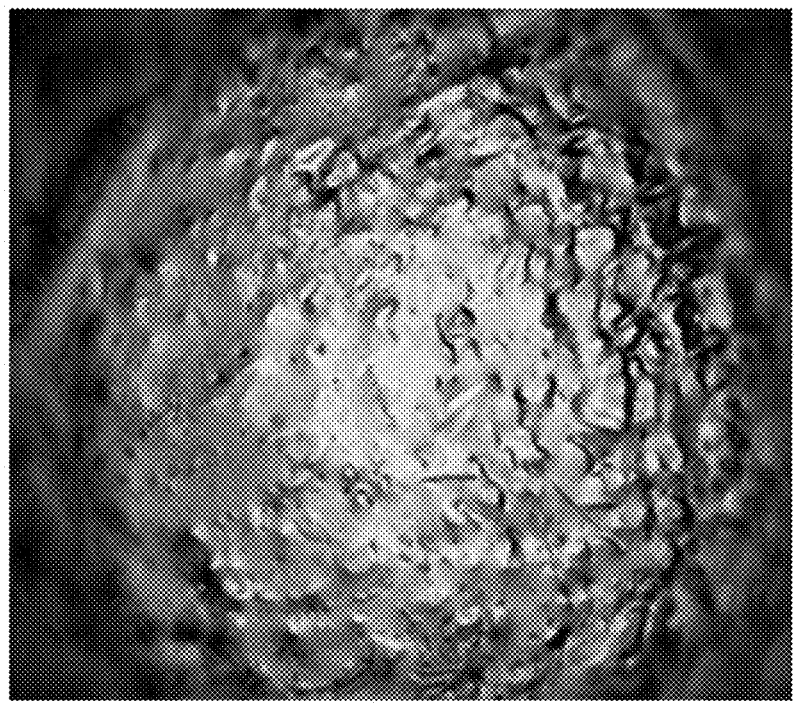
FIG. 2 is a photograph showing the surface texture of a tin-based solder interconnect produced by an undercooled solidification process.

Referring to FIG. 2, a photograph showing the surface texture of a tin-based solder interconnect such as the one shown in FIG. 1 is illustrated. The spikes on the surface of the interconnect indicate the presence of the intermetallics or intermetallic compounds discussed above in association with FIG. 1. The areas in between the spikes represent tin or beta-tin phases. The spikes on the surface of the tin-based interconnect provide a visual indicator that the microstructure of the interconnect is undesirable—i.e., the microstructure is the same or similar to that illustrated in FIG. 1. Unfortunately, particularly in flip chip applications, the surface texture of the interconnects can be difficult to visually inspect due to the interconnects' positioning between the chip and a substrate.

Figure 3:
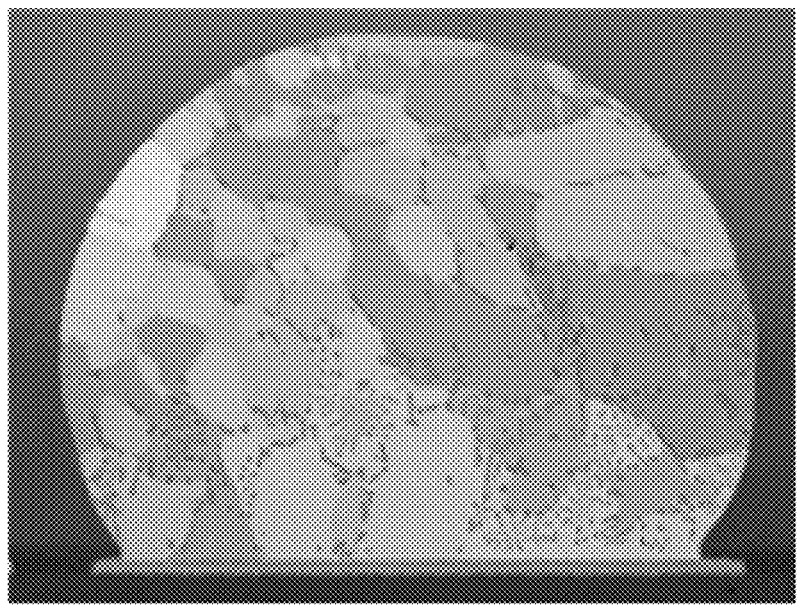
FIG. 3 is a cross-sectional view showing the internal microstructure of a tin-based solder interconnect produced by a controlled solidification process.

Referring to FIG. 3, a cross-sectional view showing the internal microstructure of a tin-based solder interconnect produced by a controlled solidification process is illustrated. This type of microstructure is more desirable in that it produces an interconnect that is more ductile and less prone to chip circuitry delamination or fracture. As can be observed in FIG. 3, the controlled solidification process produces an interconnect with relatively large grains (represented by the large light and darker grey areas) that are made up of beta-tin phases. Intermetallics or intermetallic compounds (represented by the still darker lines or dots) surround the beta-tin grains. This microstructure produces a softer interconnect that has characteristics closer to those of a conventional lead-based solder interconnect.

Figure 4:
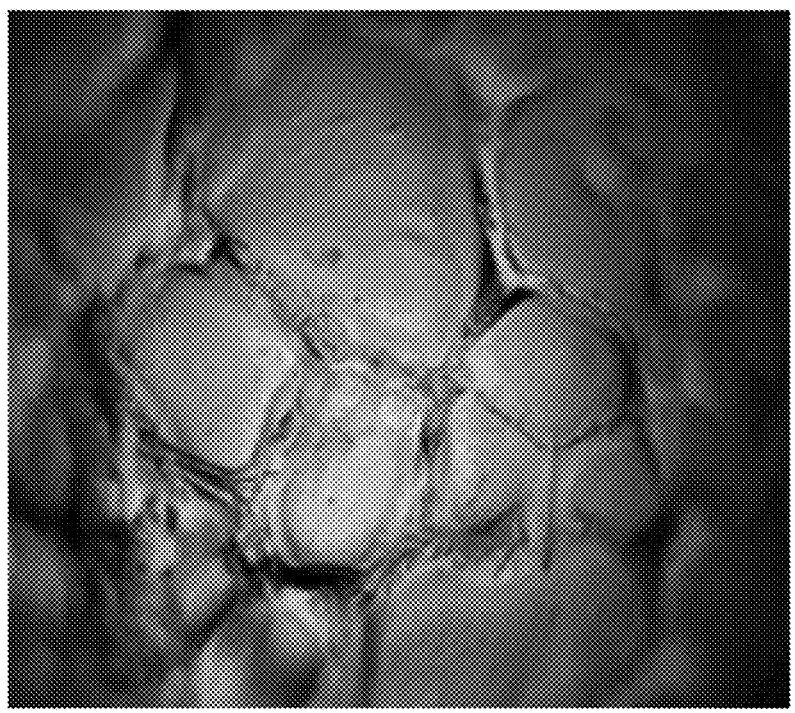
FIG. 4 is a photograph showing the "turtle shell" surface texture of a tin-based solder interconnect produced by a controlled solidification process.

Referring to FIG. 4, a photograph showing the surface texture of a tin-based solder interconnect line the one shown in FIG. 3 is illustrated. As shown, the surface texture has a "turtle shell" appearance characterized by large relatively smooth areas or shapes made primarily of tin or beta-tin. The borders around these areas or shapes contain intermetallics or intermetallic compounds. Such an appearance provides a good indicator that the internal microstructure of the interconnect is similar to or the same as the microstructure illustrated in FIG. 3. Such an appearance is desirable and will typically indicate that the tin-based interconnect has the desired physical characteristics. A trained inspector can easily differentiate between the surface textures depicted in FIGS. 2 and 4 to determine the solder's internal microstructure.

Figure 5:
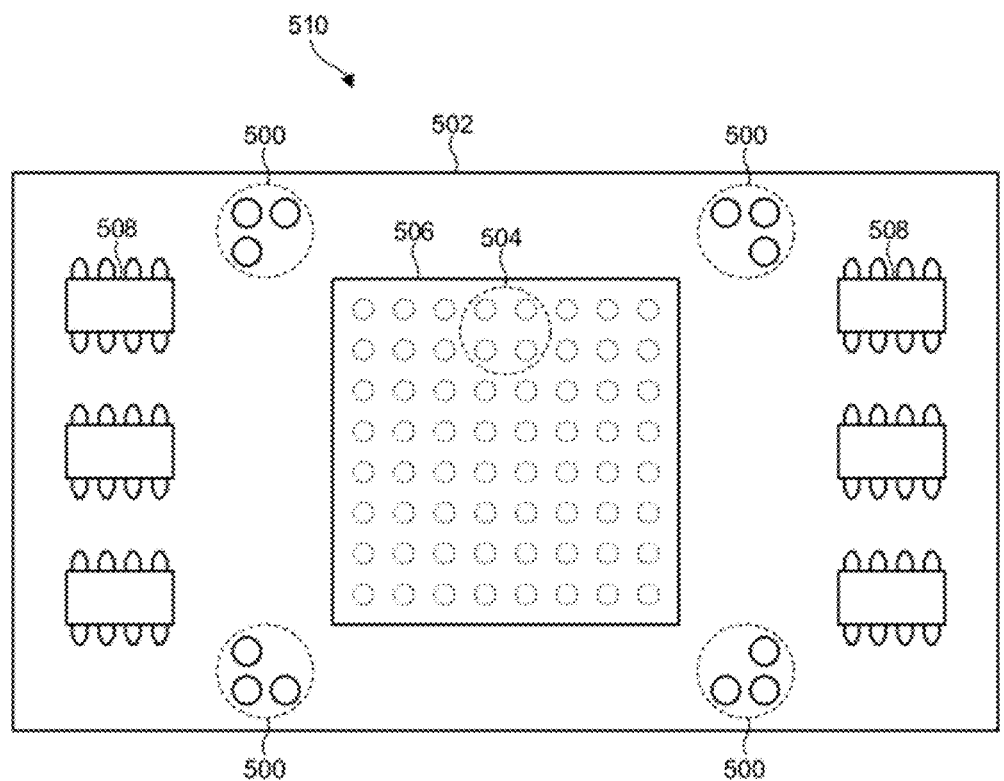
FIG. 5 is a top view of a microelectronic assembly showing multiple representative solder bumps placed at various locations on the microelectronic assembly.

Referring to FIG. 5, although FIGS. 1-4 show that there is a correlation between surface texture and internal microstructure, the surface texture of interconnects can be difficult to inspect, particularly in flip-chip applications. This is because the interconnects are typically sandwiched between the flip chip and a substrate (e.g., a printed circuit board), which are separated by a small vertical distance. The line of sight from the side of the chip may be obstructed as a result of the small vertical distance, the absence of light in the space between the chip and substrate, or other components on the substrate. It can also be difficult to position a human eye, microscope, or camera in such a way to obtain an unobstructed view of the flip-chip interconnects from the side. Thus, techniques other than or in addition to visually inspecting the flip-chip interconnects are needed to determine the internal microstructure of flip-chip interconnects. Ideally, such techniques are able to be implemented on a full-scale production line to provide substantially instantaneous quality control feedback. One such technique is illustrated in FIG. 5.

As shown in FIG. 5, in certain embodiments, one or more representative solder bumps 500 are deposited at various locations on a substrate 502. These representative solder bumps 500 have a chemical composition that is substantially the same or identical to the chemical composition of the solder bumps 504 of the flip chip 506, thereby making them "representative" of the flip-chip interconnects 504. The representative solder bumps 500 may be provided in various forms, such as balls, columns, pins, studs, bumps, or the like. Unlike the flip-chip interconnects 504, the representative solder bumps 500 may be placed at locations on the substrate 502 to enable top-side inspection. In certain embodiments, the representative solder bumps 500 are larger than the flip-chip interconnects 504 to further facilitate inspection, although in other embodiments the representative solder bumps 500 are the same size as or even smaller than the flip-chip interconnects 504. In certain embodiments, the space available on the substrate 502 may dictate the size and/or location of the representative solder bumps 500.

After the representative solder bumps 500 have passed through a reflow cycle, their surface texture may be inspected. In certain embodiments, such an inspection may be performed with the human eye, with or without the aid of a microscope or other magnification device. In other embodiments, the inspection is performed with a camera or other imaging device. Since the flip chip interconnects 504 have the same chemical composition as the representative solder bumps 500 and are passed through the same reflow cycle, the flip-chip interconnects are assured to have the same internal microstructure as the representative solder bumps 500. Thus, inspecting the representative solder bumps 500 may be treated as equivalent to inspecting the flip-chip interconnects. If the representative solder bumps 500 are determined to have an acceptable microstructure (as indicated by their surface texture), the flip-chip interconnects are also assured to have an acceptable microstructure. To the contrary, if the representative solder bumps 500 are determined to not have an acceptable microstructure, the flip-chip interconnects will also have an unacceptable microstructure. In this way, the representative solder bumps 500 may be used to accurately and quickly determine whether the microstructure of the flip-chip interconnects 504 is acceptable.

The representative solder bumps 500 may be distributed in various different ways across the substrate 502. In the illustrated embodiment, representative solder bumps 500 are placed at or near the four corners of the flip chip 506. Such a distribution may provide various advantages. For example, if the reflow cycle is applied unevenly to the microelectronic assembly 510 (i.e., the temperature across the microelectronic assembly 510 is non-uniform), the differences in the surface textures of the representative solder bumps 500 may be an indicator of the unevenness. Thus, placing the representative solder bumps 500 around the flip chip 506 may provide some assurance that the reflow cycle was applied evenly to the flip chip component 506. Nevertheless, other arrangements and locations for the representative solder bumps 500 are also possible and within the scope of the invention. The size of the representative solder bumps 500 as well as the number of representative solders bumps 500 on the substrate 502 may also vary.

It should be recognized that although the representative solder bumps 500 are described primarily as a means for verifying the microstructure of flip-chip interconnects 504, they may also be used to verify the microstructure of other solder connections on the substrate 502. For example, surface mount components 508 such as chips or discrete components may also be joined to the substrate 502 with lead-free solder. The representative solder bumps 500 may provide a visual indicator of the integrity of the solder connections for these other components.

Figure 6:
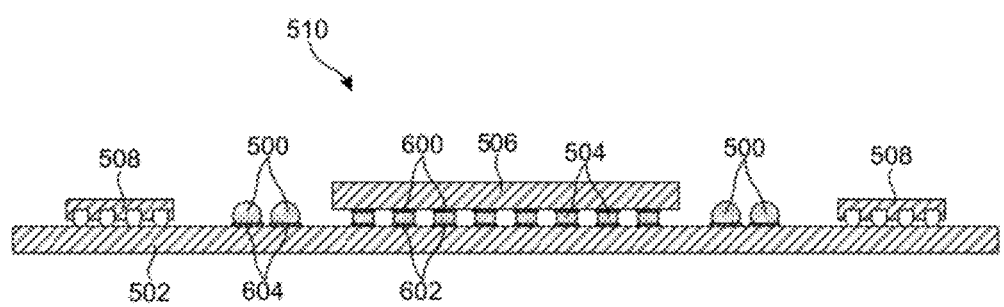
FIG. 6 is a side view of the microelectronic assembly illustrated in FIG. 5.

Referring to FIG. 6, a side view of the microelectronic assembly 510 of FIG. 5 is illustrated. As shown, the microelectronic assembly 510 includes the substrate 502, representative solder bumps 500, flip chip 506, flip-chip interconnects 504, and surface mount components 508. As further shown, the flip-chip interconnects 504 electrically connect metalized pads 600 on the flip chip 506 to matching flip-chip attach pads 602 on the substrate 502. The representative solder bumps 500 are deposited on one or more process control pads 604. In certain embodiments, the process control pads 604 are dedicated entirely to accommodating the representative solder bumps 500, having no other function. In other embodiments, the process control pads 604 have function beyond accommodating the representative solder bumps 500, meaning they could convey signals, provide attachment points for components, or the like.

Figure 7:
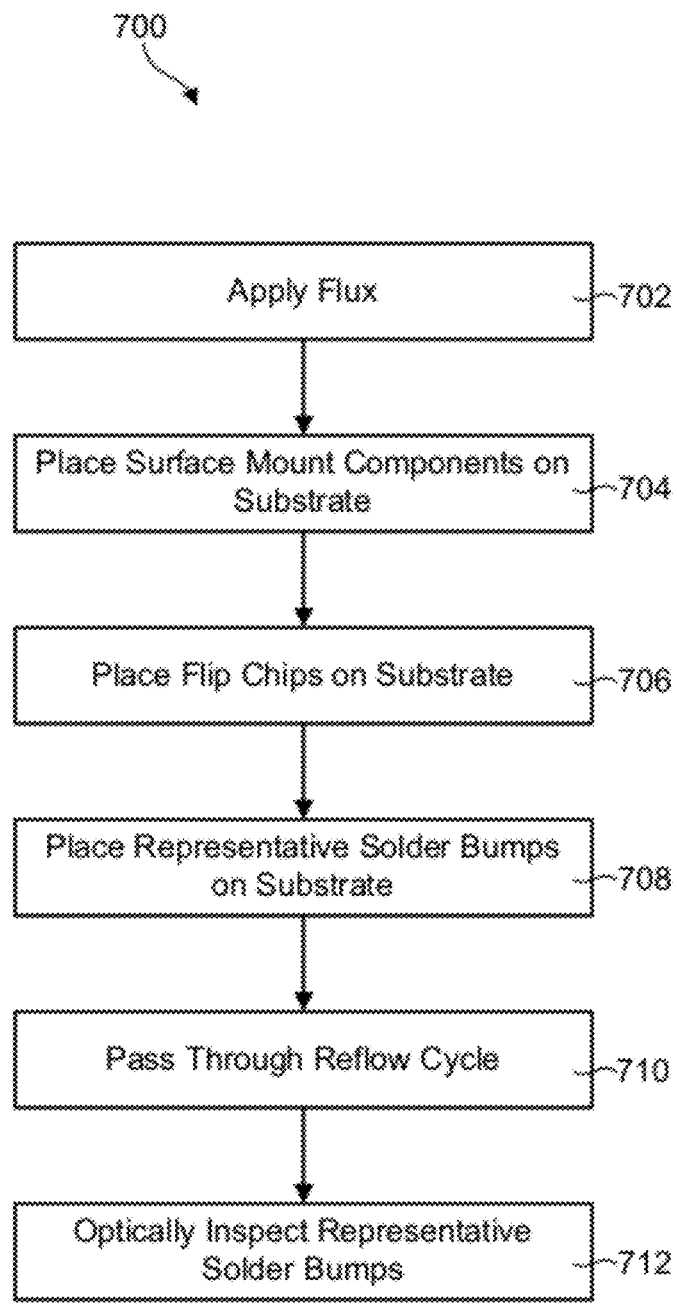
FIG. 7 is a flow chart showing one embodiment of a process for fabricating and inspecting a microelectronic assembly in accordance with the invention.

Referring to FIG. 7, one embodiment of a process 700 for fabricating and inspecting a microelectronic assembly 510 in accordance with the invention is illustrated. Starting with a substrate 502 (e.g., a printed circuit board 502), the process 700 initially applies 702 flux. The flux may remove oxidation from the flip-chip attach pads 602 and process control pads 604 as well as provide means for temporarily tacking the flip chip 506, representative solder bumps 500, and other components 508 to the substrate 502. The process 700 then places 704, 706, 708 surface mount components 508, flip chips 506, and representative solder bumps 500 on the substrate 502. Alternatively, instead of placing the representative solder bumps 500 during the chip-attach process 700, the representative solder bumps 500 could be placed on the substrate 502 prior to the chip-attach process 700, such as by the substrate vendor. The flip-chip interconnects 504 and representative solder bumps 500 are aligned with and placed in contact with the flip-chip attach pads 602 and process control pads 604 respectively.

The microelectronic assembly 510 is then passed through a reflow cycle to melt and re-solidify the flip-chip interconnects 504 and representative solder bumps 500, thereby joining the flip-chip interconnects 504 and representative solder bumps 500 to their respective pads 600, 602, 604. In certain embodiments, the reflow step 710 is accomplished by passing the microelectronic assembly 510 through a reflow oven or furnace having a desired temperature profile. As previously mentioned, the microelectronic assembly 510 may be heated and cooled in a controlled manner so the flip-chip interconnects 504 achieve a desired microstructure. The manner in which the microelectronic assembly 510 is heated and cooled may be defined by the temperature profile. This temperature profile may define the high and low temperatures reached by the furnace, the ramp rates for heating and/or cooling the microelectronic assembly 510, and the amount of time the solder is maintained in various phases such as solid or liquid phases.

Once the microelectronic assembly 510 has passed 710 through the reflow cycle, the surface texture of the representative solder bumps 500 may be optically inspected 712 to determine if the correct microstructure has been achieved. As previously mentioned, in certain embodiments, the optical inspection is performed with the human eye. In such embodiments, the representative solder bumps 500 may be sized such as to permit inspection with the naked human eye. In other embodiments, the representative solder bumps 500 are sized such as to enable visual inspection with the aid of a microscope or other magnification device. In yet other embodiments, the representative solder bumps 500 are inspected with an imaging device such as a camera. The output of such an imaging device could be analyzed by a human or a machine such as a computer or analysis device.

If the surface texture of the representative solder bumps 500 indicates that a desired microstructure has been achieved, the microelectronic assembly 510 may be accepted. If, on the other hand, the surface texture of the representative solder bumps 500 indicates that a desired microstructure has not been achieved, the microelectronic assembly 510 may be rejected.

Figure 8:
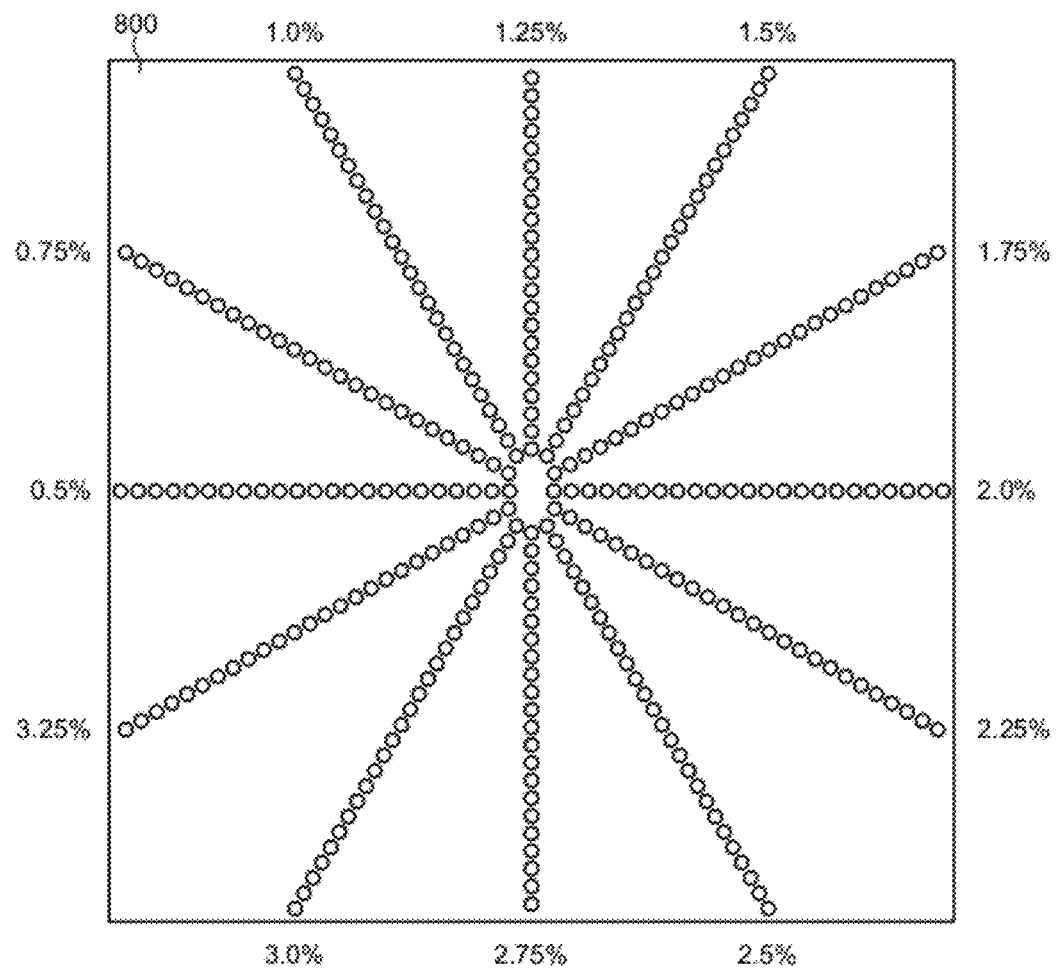
FIG. 8 shows a technique for determining the correct reflow cycle and/or tin-based solder composition to achieve controlled solidification in a manufacturing process.

Referring to FIG. 8, as described in associated with FIG. 4, a "turtle shell" appearance on the representative solder bumps 500 may indicate that the flip-chip interconnects 504 have a desired microstructure. In order to achieve such an appearance, the temperature applied to the microelectronic assembly 510 during the reflow process has to be carefully controlled. Nevertheless, other factors may also be important to achieving the desired microstructure. For example, the composition of the tin-based solder may significantly effect whether a desired microstructure is achieved for a given reflow cycle. For example, in the case of tin-silver alloy, the proportion of silver in the composition may significantly effect whether the desired microstructure is achieved. Thus, techniques are needed to identify compositions that will achieve a desired microstructure when subjected to a particular reflow cycle.

FIG. 8 shows one embodiment of a test substrate 800 for determining whether a solder composition will provide a desired microstructure through a given reflow cycle. In the illustrated embodiment, the substrate 800 includes several lines of solder bumps, each line with a different composition. For example, in the case of tin-silver alloy, the substrate 800 may include a line of solder bumps where silver is 0.5 percent of the composition, a line of solder bumps where silver is 0.75 percent of the composition, a line of solder bumps where silver is 1.0 percent of the composition, and so forth. The test substrate 800 may then be passed through a reflow cycle to melt and re-solidify the solder bumps. The surface texture of the solder bumps may then be inspected. Those that have the desired appearance (e.g., a "turtle shell" appearance) may be deemed to have a composition that is acceptable for the given reflow cycle. Those that have an undesired appearance (e.g., a spiky appearance) may be deemed to have a composition that is not acceptable for the given reflow cycle. In this way, a solder with a suitable composition may be selected for a given reflow cycle.

In the illustrated embodiment, the lines of solder bumps are arranged in a radial configuration such that they extend away radially from a central point. This configuration may be desirable to determine whether temperature changes are applied evenly to the substrate 800. For example, if solder bumps of the same composition (i.e., in the same line) exhibit different surface textures after the reflow process as their distance increases from the central point, this may be an indicator that the reflow cycle is applied to the substrate 800 unevenly. Nevertheless, the radial pattern is provided only by way of example and not limitation. Other patterns, such as two-dimensional grid patterns, circular patterns, or the like, are also possible and within the scope of the invention.

Referring to FIGS. 9A and 9B, two experiments were performed using two different test substrates 800 having various tin-silver solder compositions arranged in a grid-like pattern. The amount of silver in the tin-silver compositions ranged from 1 to 3 percent. The test substrates 800 where then subjected to two different reflow cycles, each with a different temperature profile. The pie chart illustrated in FIG. 9A shows the results of the first experiment for the first test substrate 800 subjected to the first reflow cycle. The pie chart illustrated in FIG. 9B shows the results of the second experiment for the second test substrate 800 subjected to the second reflow cycle.

As can be observed in FIG. 9A, when subjected to the first reflow cycle, tin-silver compositions with silver content of 2.0 percent or lower solidified in a controlled manner—i.e., their surface textures indicated that they achieved a desired microstructure. The tin-silver composition with silver content of 2.5 percent exhibited both controlled and uncontrolled solidification characteristics. The tin-silver composition with silver content of 3.0 percent had a surface texture indicating that it solidified in an uncontrolled manner.

As can be observed in FIG. 9B, when subjected to the second reflow cycle, tin-silver compositions with silver content of 1.5 percent or lower solidified in a controlled manner. The tin-silver compositions with silver content of 1.667 percent and 1.75 percent exhibited both controlled and uncontrolled solidification characteristics. The tin-silver compositions with silver content of 1.825 percent and higher had surface textures indicating that they were solidified in an uncontrolled manner.

Figure 10A:
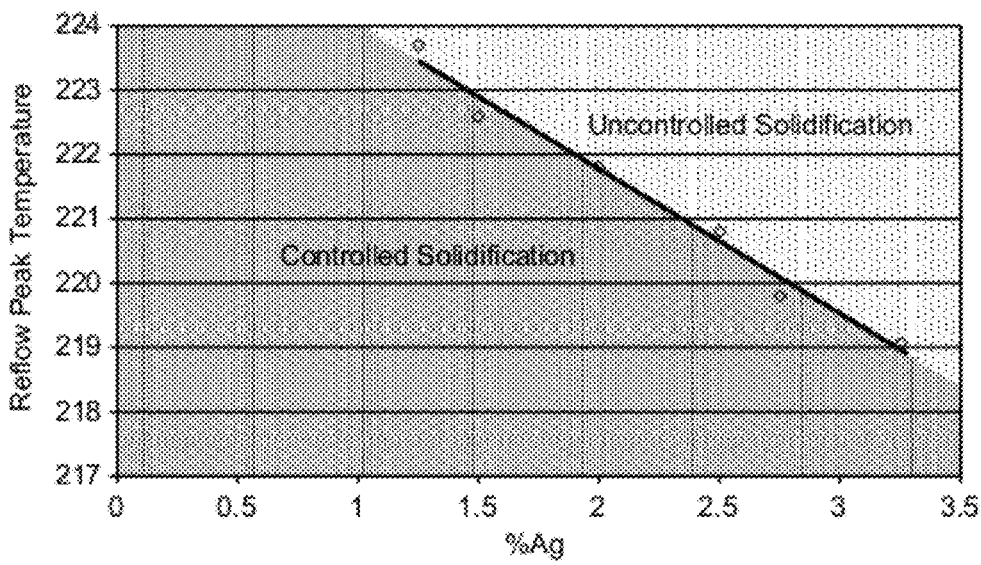
FIG. 10A is a graph showing one example of a reflow process window generated using a test substrate like that illustrated in FIG. 8.
Figure 10B:
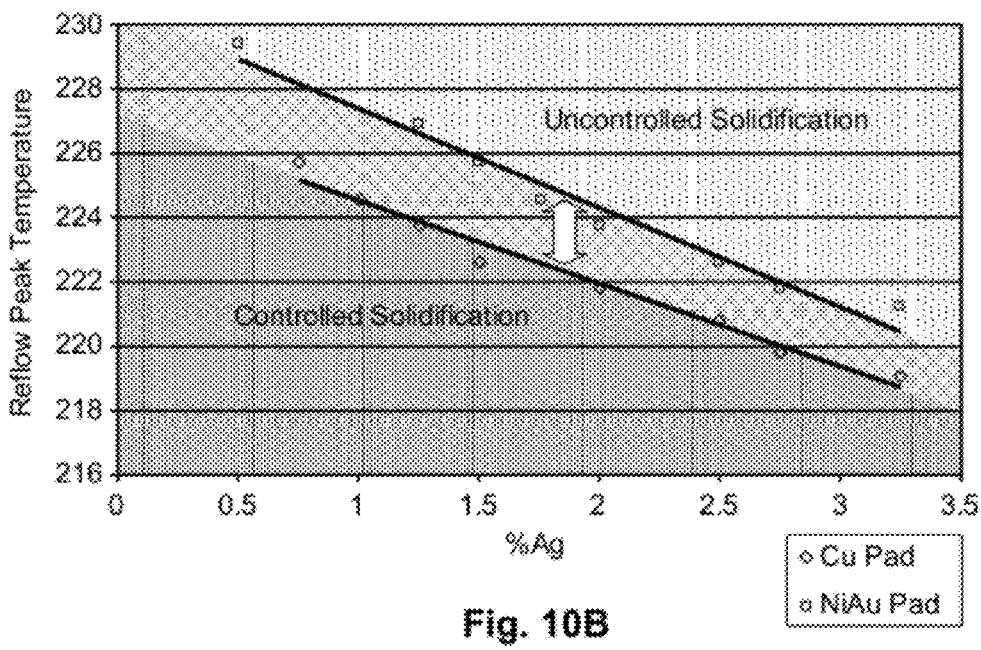
FIG. 10B is a graph showing another example of a reflow process window generated using a test substrate like that illustrated in FIG. 8.

Referring to FIGS. 10A and 10B, a test substrate 800 such as that illustrated in FIG. 8 may also be used to determine the correct reflow process for a determined solder composition. It may also be used to determine a reflow process window for a specific solder alloy. For example, FIG. 10A is a graph showing a reflow process window for a specific tin-silver alloy composition. The reflow process window shows a temperature range needed to achieve controlled solidification of the alloy composition. As can be observed in FIG. 10A, for a solder composition that is 2.75 percent silver, control solidification is achieved between 217° C. and 220° C.

The test substrate 800 may also be used to determine the impact of a solder composition on the reflow process window. For example, as can be observed in FIG. 10A, varying the percentage of silver from 1.25 to 2.75 percent reduces the top end of the temperature range from 223.5° C. and 220° C. Among other benefits, a test substrate 800 may be used to determine: (1) an optimal solder composition for specific reflow parameters; (2) the impact of changing the alloy composition on the reflow process window; and (3) the solidus and liquidus temperature of a specific alloy (i.e., to determine the solid and liquid temperature range). FIG. 10B is a graph showing the impact of changing an alloy composition on the reflow process window. In the illustrated example, the receiving pads are changed from copper to gold. The arrow between the plotted lines shows the additional controlled solidification range using the gold pad.

The techniques disclosed herein may be embodied in other specific forms without departing from their spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for verifying the internal microstructure of interconnects in flip-chip applications, the method comprising:
   providing a microelectronic assembly comprising:
      a substrate comprising an array of flip-chip attach pads and a process control pad;
      a flip chip comprising an array of solder bumps in contact with the array of flip-chip attach pads;
      a representative solder bump on the process control pad and positioned such as to enable top-side inspection of the representative solder bump after the microelectronic assembly has undergone a reflow cycle, the representative solder bump having substantially the same chemical composition as the array of solder bumps;
   applying a reflow cycle to the microelectronic assembly to melt and solidify the array of solder bumps and the representative solder bump; and
   optically inspecting a surface texture of the representative solder bump to determine the internal microstructure of the array of solder bumps.

2. The method of claim 1, wherein the array of solder bumps and the representative solder bump are lead-free.

3. The method of claim 1, wherein the array of solder bumps and the representative solder bump are made from a tin-based alloy.

4. The method of claim 3, wherein the tin-based alloy comprises at least one alloy additive selected from the group consisting of silver, copper, nickel, bismuth, and gold.

5. The method of claim 1, wherein inspecting the surface texture comprises determining whether the surface texture has a "turtle shell" appearance.

6. The method of claim 5, further comprising accepting the microelectronic assembly if the surface texture has a "turtle shell" appearance, and rejecting the microelectronic assembly if the surface texture does not have a "turtle shell" appearance.

7. The method of claim 6, further comprising altering the reflow cycle in response to rejecting the microelectronic assembly.

8. The method of claim 6, further comprising altering the chemical composition in response to rejecting the microelectronic assembly.

9. The method of claim 1, wherein optically inspecting comprises optically inspecting with a human eye.

10. The method of claim 9, wherein optically inspecting with the human eye comprises using a microscope to optically inspect with the human eye.

11. The method of claim 1, wherein optically inspecting comprises optically inspecting with a machine.

12. The method of claim 1, wherein the representative solder bump is one of a plurality of representative solder bumps distributed across the substrate.

13. A microelectronic assembly providing easy verification of the internal microstructure of flip-chip interconnects, the microelectronic assembly comprising:
   a substrate comprising an array of flip-chip attach pads and a process control pad;
   a flip chip comprising an array of solder bumps bonded to the array of flip-chip attach pads; and
   a representative solder bump bonded to the process control pad and viewable from a top side thereof, the representative solder bump having substantially the same chemical composition as the array of solder bumps, the representative solder bump having a surface texture providing a visual indicator of the internal microstructure of the array of solder bumps.

14. The microelectronic assembly of claim 13, wherein the array of solder bumps and the representative solder bump are made from a tin-based alloy.

15. The microelectronic assembly of claim 14, wherein the tin-based alloy comprises at least one alloy additive selected from the group consisting of silver, copper, nickel, bismuth, and gold.

16. The microelectronic assembly of claim 13, wherein the representative solder bump is one of a plurality of representative solder bumps distributed across the substrate.

17. The microelectronic assembly of claim 13, wherein a "turtle shell" surface texture on the representative solder bump indicates that the internal microstructure is acceptable.

18. A method for determining a suitable lead-free solder composition for use in a microelectronic assembly, the method comprising:
   providing a substrate;
   depositing a plurality of solder bumps on the substrate, the plurality of solder bumps comprising solder bumps of at least two different compositions, the plurality of solder bumps positioned on the substrate such as to enable top-side inspection of the plurality of solder bumps on the substrate after the substrate and solder bumps have undergone a reflow cycle;
   passing the substrate through a reflow cycle to melt and solidify the plurality of solder bumps;
   optically inspecting the surface texture of the plurality of solder bumps to determine which of the plurality of solder bumps has a desired microstructure; and
   selecting a composition associated with a solder bump having a desired microstructure for use in a microelectronic assembly.

19. The method of claim 18, wherein optically inspecting the surface texture comprises determining whether the surface texture has a "turtle shell" appearance.

* * * * *